(12) United States Patent
Normann et al.

(10) Patent No.: US 12,706,889 B2
(45) Date of Patent: Aug. 11, 2026

(54) SECURING COLLECTION OF INFORMATION OF TENANT CONTAINER

(71) Applicant: Telefonaktiebolaget LM Ericsson (publ), Stockholm (SE)

(72) Inventors: Henrik Normann, Malmö (SE); Lina Pålsson, Genarp (SE); Bernard Smeets, Dalby (SE); Mikael Eriksson, Alingsås (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 36 days.

(21) Appl. No.: 18/695,133

(22) PCT Filed: Oct. 1, 2021

(86) PCT No.: PCT/EP2021/077062
§ 371 (c)(1),
(2) Date: Mar. 25, 2024

(87) PCT Pub. No.: WO2023/051933
PCT Pub. Date: Apr. 6, 2023

(65) Prior Publication Data
US 2025/0168150 A1 May 22, 2025

(51) Int. Cl.
*H04L 9/40* (2022.01)
*H04L 9/30* (2006.01)

(52) U.S. Cl.
CPC ............ *H04L 63/0428* (2013.01); *H04L 9/30* (2013.01)

(58) Field of Classification Search
CPC ......... H04L 9/006; H04L 9/0816; H04L 9/30; H04L 9/3263; H04L 63/04;
(Continued)

(56) References Cited

U.S. PATENT DOCUMENTS 10,447,720 B1 * 10/2019 Evans ................. H04L 63/0428
11,050,765 B2 6/2021 Lin et al.
(Continued)

FOREIGN PATENT DOCUMENTS

CN 105160269 A * 12/2015 ............ G06F 21/62
EP 3422234 A1 * 1/2019 ............ G06F 21/53
(Continued)

OTHER PUBLICATIONS

Ranjbar et al., SynAPTIC: Secure and Persistent connec TIvity for Containers, 17th IEEE/ACM International Symposium on Cluster, Cloud and Grid Computing (Year: 2017).*
(Continued)

*Primary Examiner* — Oscar A Louie
(74) *Attorney, Agent, or Firm* — Rothwell, Figg, Ernst & Manbeck, P.C.

(57) ABSTRACT

Embodiments of the present disclosure provide a method, a first computing device, a second computing device, and a computer program product for securing the information related to a tenant container. The method is performed by a first computing device. The method comprises receiving, from an endpoint agent resident on the first computing device, information collected from the tenant container during execution of the tenant container and encrypting at least some of the information related to the tenant container. Further, the method comprises transmitting the encrypted information to be decrypted at a second computing device in a secure environment for analysing the information at the second computing device. Corresponding first computing device, second computing device and computer program products are also disclosed.

10 Claims, 9 Drawing Sheets

(58) Field of Classification Search
CPC . H04L 63/0428; H04L 63/0442; G06F 21/53; G06F 21/60; G06F 21/602; G06F 21/606; G06F 21/62; G06F 21/6218; G06F 21/629
See application file for complete search history.

(56) References Cited

U.S. PATENT DOCUMENTS

| | | | | |
|---|---|---|---|---|
| 11,841,806 | B1 * | 12/2023 | Chhabra | G06F 21/52 |
| 11,995,197 | B2 * | 5/2024 | Huo | H04L 9/14 |
| 2018/0309747 | A1 * | 10/2018 | Sweet | G06F 9/45558 |
| 2018/0349629 | A1 * | 12/2018 | Chenchev | G06F 21/568 |
| 2018/0373885 | A1 * | 12/2018 | Arad | G06F 21/629 |
| 2019/0260716 | A1 * | 8/2019 | Lerner | H04L 63/0876 |
| 2020/0162346 | A1 | 5/2020 | Diaz-Cuellar et al. | |
| 2022/0283794 | A1 * | 9/2022 | Wolfson | H04L 9/0822 |
| 2022/0329576 | A1 * | 10/2022 | Nikam | H04L 63/0272 |
| 2023/0030816 | A1 * | 2/2023 | Bursell | G06F 21/57 |
| 2023/0068788 | A1 * | 3/2023 | Thubert | G06F 9/455 |
| 2023/0095755 | A1 * | 3/2023 | Fritz | H04L 9/088<br>713/171 |

FOREIGN PATENT DOCUMENTS

| | | | | |
|---|---|---|---|---|
| EP | 3841506 | B1 * | 5/2025 | G06F 21/62 |
| WO | WO-2021173716 | A1 * | 9/2021 | H04L 67/60 |

OTHER PUBLICATIONS

Arnautov et al., Scone: Secure Linux Containers with Intel SGX, 12th USENIX Symposium on Operating Systems Design and Implementation (Year: 2016).*

Giannakopoulos et al. Isolation in Docker through Layer Encryption, IEEE 37th International Conference on Distributed Computing Systems (Year: 2017).*

Saether et al., Security in Docker Swarm: orchestration service for distributed software systems (Year: 2018).*

International Search Report and Written Opinion mailed Jun. 3, 2022 in corresponding International Application No. PCT/EP2021/077062 (8 pages).

Khan, et al., "Cloud Long Forensics: Foundations, State of the Art, and Future Directions", ACM Computing Surveys, vol. 49, No. 1, Article 7, May 12, 2016 (42 pages).

* cited by examiner

SECURING COLLECTION OF INFORMATION OF TENANT CONTAINER

CROSS REFERENCE TO RELATED APPLICATION(S)

This application is a 35 U.S.C. § 371 National Stage of International Patent Application No. PCT/EP2021/077062, filed Oct. 1, 2021, designating the United States.

TECHNICAL FIELD

The present disclosure relates generally to the field of cloud security systems. More particularly, it relates to method, computing device and computer program products for securing collection of information of a tenant container.

BACKGROUND

Various mechanisms for providing virtualized computing resources are evolving. For instance, container technologies and corresponding container clustering platforms are emerging as a solution for implementing flexible and scalable application virtualization mechanisms. In such mechanisms, an application may be implemented using a set of containers, for example, with different functions that are provisioned on a set of computing resources, where the computing resources can be physical computing resources or virtual computing resources such as virtualized in a data center or multiple data centers or container clustering platforms.

Usage of containers is method of virtualization of computers or, more specifically, computer software applications. A container separates the application from the operating system and physical infrastructure it uses to connect to the computing network. The use of containers, for example, Docker, is known for rapid provisioning within clusters and cloud environments. Docker is an open platform container for developers and system administrators to build and run distributed applications.

Typically, a container refers to a software package that may be executed in a computing device. The container may be provided as service which is commonly referred to container as a service, CaaS, in which an organization providing runtime and resources for another organization to deploy their container(s) in a public cloud. The organization hosting the containers may be known as a cloud service provider, CSP and the organization that provides the container to the CSP is typically referred to as a tenant. Further, the organization providing the container to a tenant is typically referred as a vendor of the container.

As illustrated in FIG. 1, the CSP may allow the container belonging to the tenant, i.e., a tenant container 25 to be hosted and executed in any computing device or an electronic device such as a first computing device 102. The tenant container 25 is instantiated within kernel 20 of operating system, and the tenant container 25 virtualizes the instance of an application. The tenant container 25 does not include the operating system like a virtual machine. The use of containers enable running multiple applications using same computer resources of the first computing device 102, without the applications interfering each other. Typically, the tenant container 25 doesn't have an externally available IP address of its own, although it has a unique ID that may be used by the CSP that hosts the tenant container 25. A server or the CSP manages the tenant container, and the tenant container 25 manages the application code.

The tenant has no control or ownership of the underlying hardware 15 including a central processing unit, CPU 10, memory 12 and devices 14. An endpoint agent 40, which may for example, an endpoint detection and response, enables the CSP to have control over the tenant container 25 it is hosting. The endpoint agent 40 may detect when the tenant container 25 shows suspicious behavior and also collects the information related to the execution when a security alert occurs. The collected information by the endpoint agent 40 residing in the first computing device 102 is then transmitted to an endpoint agent 40 in the second computing device 40 i.e., a server, which may be later used for analysing the collected information to detect a cyber-threat. In some instances, the collected information by the endpoint agent 40 may be used for forensics. Therefore, the CSP can register potential container breakouts and other unwanted behavior and also to determine the root cause of the suspicious behavior. Further, the endpoint agent 40 also enables the CSP to easily collect an unlimited amount of information from the tenant container 25.

Thus, the CSP can host and run many tenant containers producing a lot of valuable information. Some of the information the tenant containers produce are metadata and general logging while other information within the tenant container may be sensitive.

SUMMARY

In general, a tenant has a service level agreement with cloud service provider, CSP, but how the tenant can be assured that the CSP is fulfilling the agreement may be hard for the tenant to verify. The tenant can trust the CSP as an organization. However, it may in some instances happen that a rogue insider within the organization may breach the service level agreement. It is also possible that, during setup of the container environment it can be made in a secure manner potentially under direct supervision by the tenant. However, during normal operation, the tenant may not constantly supervise the operating environment and the risk for a rogue insider increases and remains a constant threat. Some of the information the tenant containers produce are metadata and general logging while other information within the tenant container may be sensitive.

Consequently, there is a need for an improved method and arrangement for securing a tenant container that alleviates at least some of the above cited problems.

It is therefore an object of the present disclosure to provide a method, a first computing device, a second computing device and a computer program product for securing information related to the tenant container to mitigate, alleviate, or eliminate all or at least some of the above-discussed drawbacks of presently known solutions.

This and other objects are achieved by means of a method, a first computing device, a second computing device and a computer program product as defined in the appended claims. The term exemplary is in the present context to be understood as serving as an instance, example or illustration.

According to a first aspect of the present disclosure, a method for securing a tenant container executed by a first computing device is provided. The method is performed by the first computing device. The method comprises receiving, from an endpoint agent resident on the first computing device, information collected from the tenant container during execution of the tenant container and encrypting at least some of the information related to the tenant container. Further, the method comprises transmitting the encrypted information to be decrypted at a second computing device in a secure environment in the second computing device. The information collected from the tenant container by the endpoint agent is not accessible to one or more processes that are being executed on the first computing device.

In some embodiments, the method further comprising identifying at least some of the information related to the tenant container to be encrypted.

In some embodiments, the method further comprising transmitting the encrypted information to a tenant associated with the tenant container.

In some embodiments, the step of encrypting at least some of the information related to the tenant container comprises registering for an encryption service executing within a secure environment hosted by the second computing device and obtaining a public key which is generated within or inserted into the secure environment, hosted by the second computing device. The method further comprises encrypting at least some of the information related to the tenant container using the public key.

In some embodiments, the step of registering for an encryption service executing within the secure environment hosted by the second computing device comprises generating a request for the encryption service and transmitting the request for the encryption service to the secure environment.

In some embodiments, wherein the information from the tenant container comprises metadata, events, and alerts related to multiple software processes, relationships between the software processes, operation of the first computing device, private data, Personal Identifiable Information, PII, related to the tenant container, and operating system configuration changes.

According to a second aspect of the present disclosure, a method for securing information related to a tenant container is provided. The method is performed by a second computing device. The method comprises receiving encrypted information related to the tenant container from a first computing device and decrypting the encrypted information in a secure environment hosted by the second computing device. Further, the method comprises controlling the information leaving the secure environment.

In some embodiments, the step of controlling the information leaving the secure environment comprises receiving, from a tenant associated with the tenant container or configured, an input identifying what information related to tenant container leaves the secure environment hosted by the second computing device and masking at least some of the information related to the tenant container based on the received input or other configuration.

In some embodiments, the input identifying the information comprises one or more of: type of information of the tenant container, selection of information and metadata of the tenant container.

In some embodiments, the step of controlling the information leaving the secure environment comprises identifying the information leaving the secure environment and selectively masking at least some of the identified information leaving the secure environment.

In some embodiments, the step of controlling the information leaving the secure environment comprises selectively encrypting the information by identifying the information leaving the secure environment and selectively replacing at least some of the identified information leaving the secure environment with a plurality of encrypted strings.

In some embodiments, the step of controlling the information leaving the secure environment comprises selectively encrypting the information by identifying the information leaving the secure environment and result of analysis of the identified information leaving the secure environment.

In some embodiments, composition of the information leaving the secure environment is dependent on a receiver of the information. For example, the receiver may be a tenant associated with the tenant container and a cloud service provider, CSP, hosting the tenant container.

In some embodiments, the step of decrypting the encrypted information in a secure environment comprises registering for an encryption service executing within the secure environment hosted by the second computing device and obtaining a private key which is generated or inserted into the secure environment in the second computing device. Further, the method comprises decrypting the encrypted information related to the tenant container using the private key.

In some embodiments, the step of registering for an encryption service executing within a secure environment hosting the second computing device comprises generating a request for the encryption service and transmitting the request for the encryption service to the secure environment.

In some embodiments, the information from the tenant container comprises metadata, events, and alerts related to multiple software processes, relationships between the software processes, operation of the first computing device, private data, Personal Identifiable Information, PII, related to the tenant container, and operating system configuration changes.

In some embodiments, a summary of the information leaving the secure environment is generated in the secure environment.

In some embodiments, the method further comprising transmitting, to a tenant associated with the tenant container, the summary of the information leaving the secure environment.

According to a third aspect of the present disclosure, a first computing device for securing a tenant container is provided. The first computing device being adapted for receiving, from an endpoint agent resident on the first computing device (102), information collected from the tenant container during execution of the tenant container and encrypting at least some of the information related to the tenant container. Further, the first computing device being adapted for transmitting the encrypted information to be decrypted at a second computing device in a secure environment in the second computing device. The information collected from the tenant container by the endpoint agent is not accessible to one or more processes that are being executed on the first computing device.

According to a fourth aspect of the present disclosure, a second computing device for securing information related to a tenant container is provided. The second computing device being adapted for receiving encrypted information related to the tenant container from a first computing device. Further, the second computing device being adapted for decrypting the encrypted information in a secure environment hosted in the second computing device and controlling the information leaving the secure environment.

According to a fifth aspect of the present disclosure, there is provided a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

According to a sixth aspect of the present disclosure, there is provided a computer program comprising instructions which, when the computer program is executed by a computer, cause the computer to carry out the method according to any of the first and second aspects.

An advantage of some embodiments is that alternative and/or improved approaches are provided for securing collection of information of the tenant container.

An advantage of some embodiments is that privacy and transparency may be provided for a tenant and a vendor of the container that may dynamically control how much information related to the tenant container is fetched by the endpoint agent.

An advantage of some embodiments is that, the information related to the tenant container, which is original and unaltered information is stored and protected in a secure environment, i.e., a trusted execution environment, which may be beneficial for analysing the information in the secure environment.

An advantage of some embodiments is that the tenant or the vendor may determine the information related to the tenant container that is extracted by the CSP for analysis.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
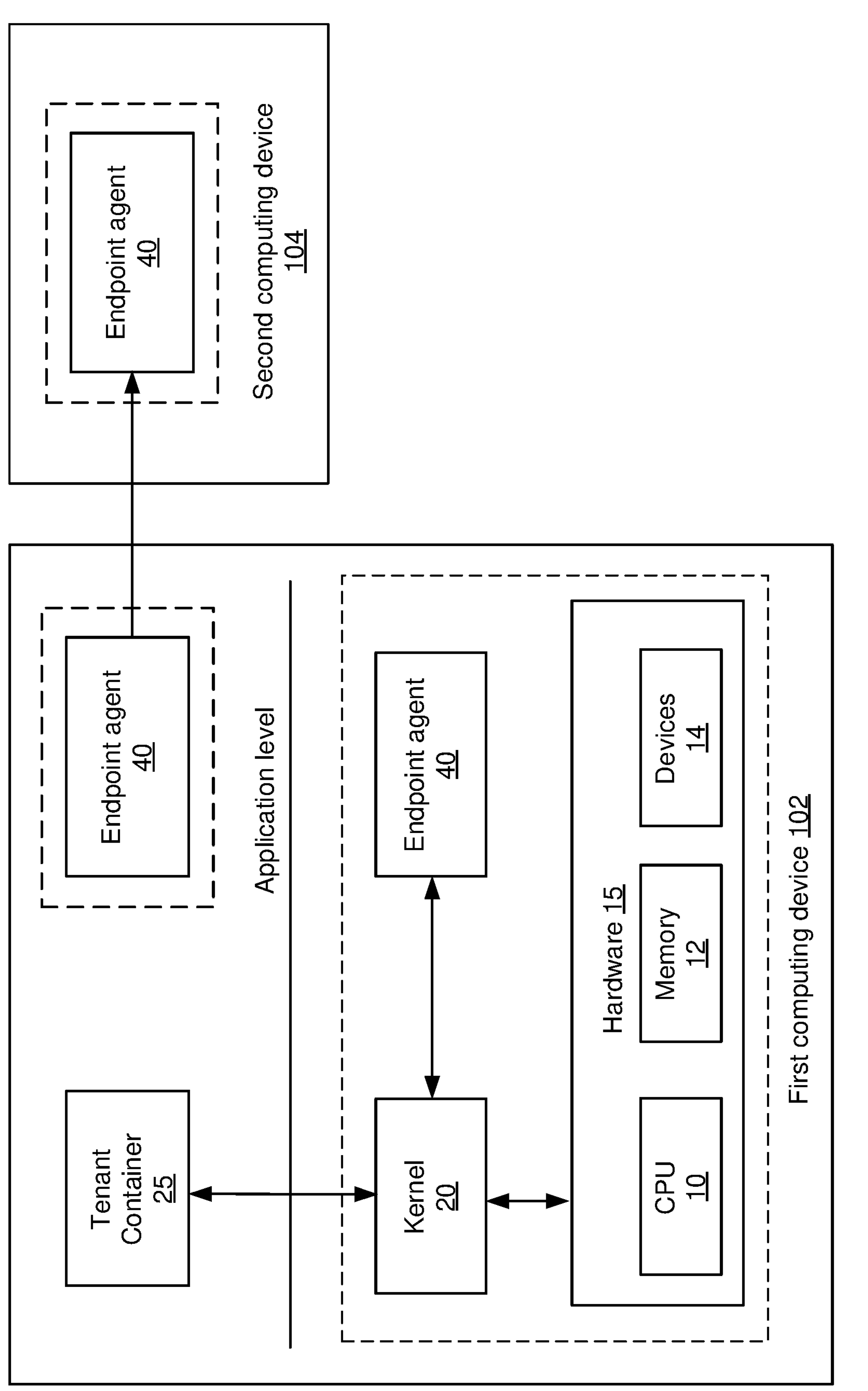
FIG. 1 discloses an existing implementation of a cloud service provider hosting a tenant container.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

It will be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

Figure 2:
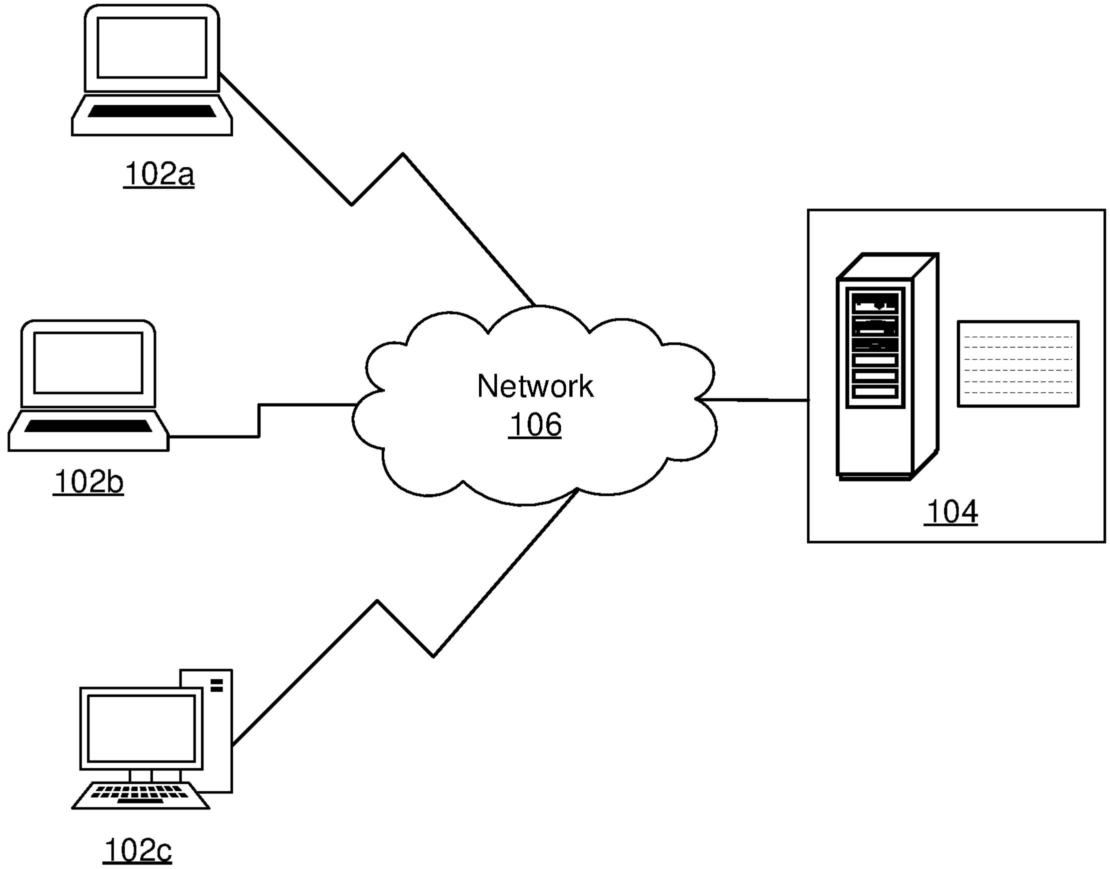
FIG. 2 discloses block diagram illustrating computing devices connected to a network.

FIG. 2 discloses block diagram illustrating computing devices connected to a network. As depicted in FIG. 2, there may be a plurality of first computing devices 102*a*, 102*b* and 102*c*, (which may be collectively referred as 102) connected a network 106. The network 106, for example, may be an informational technology network, an operational technology network, a cloud infrastructure, a software as a service, SaaS, infrastructure or any combination of these four, connected to each of the first computing devices 102*a*, 102*b* and 102*c*. A second computing device 104 may be a server or any electronic device that receives information related to a tenant container from an endpoint agent (not shown) which is resident on each of the first computing devices 102*a*, 102*b* and 102*b* for analysis of the information, for example, to detect any suspicious behaviour.

Each of the first computing device 102*a*, 102*b* and 102*c* may include one or more tenant containers hosted by a cloud service provider, CSP and an endpoint agent, for example an endpoint detection and response unit. Each of the first computing devices 102*a*, 102*b* and 102*c* execute the tenant containers. Further, the endpoint agents may be configured to monitor and collect the information from the tenant container being executed on the first computing devices 102*a*, 102*b* and 102*c*.

The endpoint agents that are resident on the first computing devices 102*a*, 102*b* and 102*c* enable the CSP, to have control over the tenant containers which are hosted by the CSP. The endpoint agent may detect when the tenant container 25 shows suspicious behavior and also collect the information related to the execution when a security alert occurs. The collected information by the endpoint agent residing in the first computing device 102*a* is then transmitted to an endpoint agent in the second computing device 104 i.e., a server, which may be later used for analysing the collected information to detect a cyber-threat. Therefore, the CSP can register potential container breakouts and other unwanted behavior and also to determine the root cause of the suspicious behavior. Further, the endpoint agent on the first computing device 102*a* also enables the CSP to easily collect an unlimited amount of information from the tenant container. Some of the information the tenant containers produce are metadata and general logging while other information within the tenant container may be sensitive.

Therefore, according to some embodiments of the present disclosure, the first computing device 102*a* implements a method for efficiently securing the information related to the tenant container executed in the first computing device 102*a*. It should be noted that any of the first computing devices 102*a*, 102*b* and 102*c*, hereinafter referred to as 102, may implement the method for securing the information related to the tenant container.

According to some embodiments, the first computing device 102 may be adapted to receive, from an endpoint agent resident on the first computing device 102, information collected from the tenant container during execution of the tenant container. In some examples, the information related to the tenant container or the information from the tenant container may include metadata, events, and alerts related to multiple software processes, relationships between the software processes, operation of the first computing device, private data, Personal Identifiable Information, PII, related to the tenant container, and operating system configuration changes. At least some of the above information from the tenant container may be encrypted. For example, the first computing device may use a public key for encrypting the information. Further, the encrypted information may be transmitted to the second computing device 104, in which the second computing device 104 decrypts the encrypted information related to the tenant container in a secure environment.

In some embodiments, the first computing device 104 may transmit the encrypted information to a tenant associated with the tenant container. Thus, the tenant may receive the encrypted information related to the tenant container and the tenant may decrypt the encrypted information using a private key. Therefore, the tenant can identify the information of the tenant container that is extracted by the CSP for analysis.

According to some embodiments of the present disclosure, the second computing device 104 may also implement a method for securing the information related to the tenant container. The second computing device 104 may be adapted to receive the encrypted information related to the tenant container from the first computing device 102. The second computing device 104 may decrypt the encrypted information in a secure environment hosted by the second computing device, for example, using a private key. In some examples, the secure environment is a trusted execution environment hosted by the second computing device 104. Further, the second computing device 104 may control the information leaving the secure environment.

In some examples, the second computing device 104 processes the information related to the tenant container to analyze the information. The trusted execution environment may include at least an encryption service to encrypt or decrypt information provided to the encryption service from the second computing device within the secure environment.

Various embodiments for securing the information related to the tenant container are explained in conjunction with figures in the later parts of the description.

Figure 3:
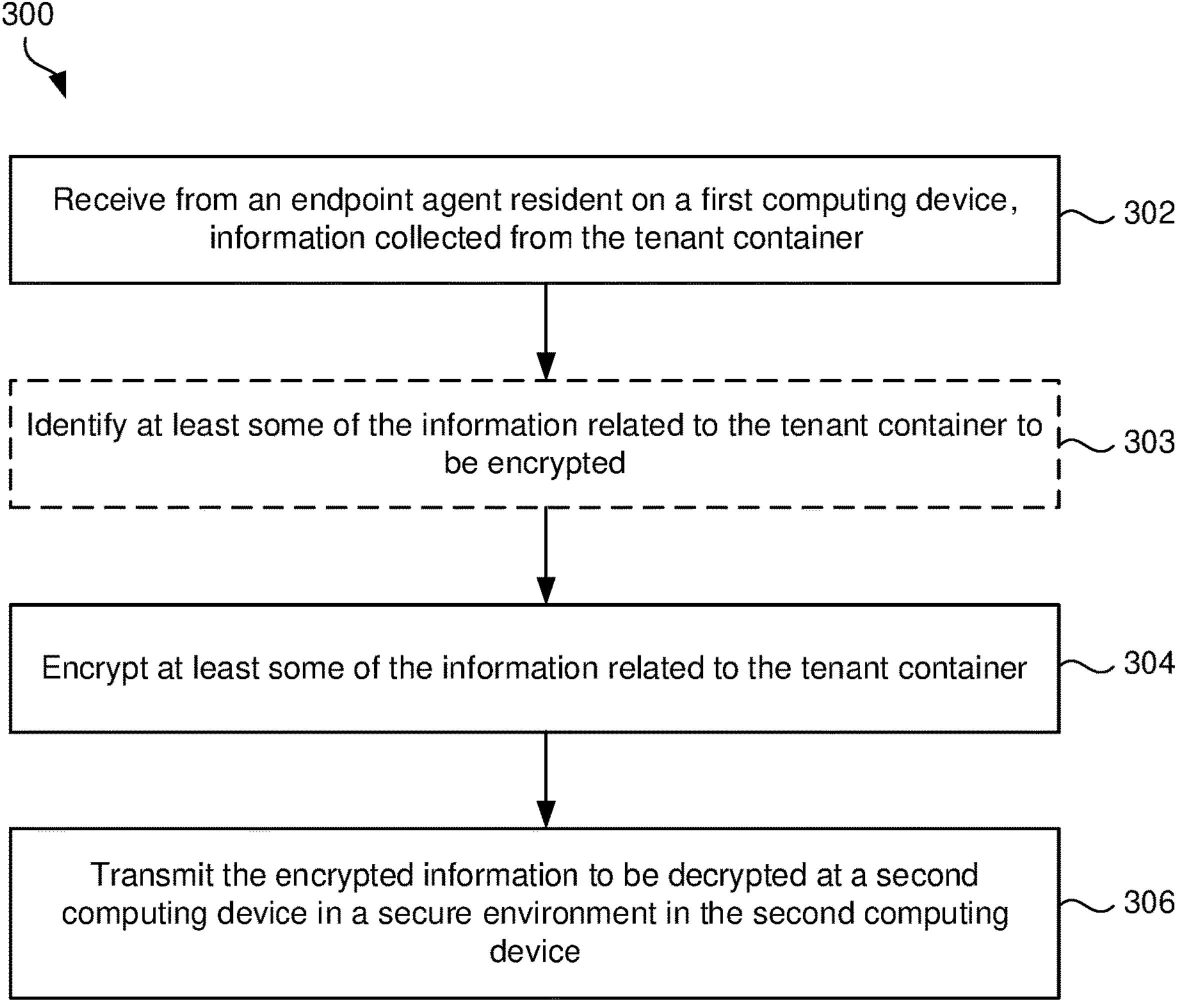
FIG. 3 is a flowchart illustrating example method steps of a method performed by a first computing device for securing information related to a tenant container.

FIG. 3 is a flowchart illustrating example method steps of a method 300 performed by the first computing device for securing the information related to the tenant container. As stated above, the first computing device performs the method 300 for securing the tenant container executed by the first computing device. For example, the information related to the tenant container may include but not limited to data that includes metadata, events, and alerts regarding at least the users, multiple software processes, relationships between the software processes, operation of the first computing device, private data, Personal Identifiable Information, PII, operating system configuration changes, and combinations of these parameters.

At step 302, the method 300 comprises receiving, from an endpoint agent resident on the first computing device, information collected from the tenant container during execution of the tenant container. The tenant container may be hosted by the CSP in the first computing device and the first computing device may execute the tenant container. When the tenant container is being executed by the first computing device, the endpoint agent resident on the first computing device may be configured to collect the information related to the tenant container. The endpoint agent may be for example, an endpoint detection and response unit configured to monitor and collect information from the tenant container executing on the first computing-device. In some examples, the endpoint agent may belong to the CSP that has hosted the tenant container in the first computing device. The information collected from the tenant container by the endpoint agent is received. For example, a controlled forward of information, CFM, module is implemented in the first computing device to receive the collected information related to the tenant container from the endpoint agent resident on the first computing device. The CFM module is configured such that it exclusively interacts with the endpoint agent to receive the collected information related to the tenant container from the endpoint agent.

It should be noted that the information collected from the tenant container by the endpoint agent is not accessible to one or more processes that are being executed on the first computing device, other than the CFM as described above. There may be an exclusive access between the endpoint agent and the CFM and no other process that is being executed at the first computing device can access the information collected by the endpoint agent from the tenant container. Further, it should also be noted that no process running on the first computing device can interact with the endpoint agent.

In some examples, it may be possible that the endpoint agent may belong to the tenant. In such case, the CSP may implement the endpoint agent of the tenant, as requested by the tenant, to collect the information from the tenant container since the outcome of endpoint agent can be in the interest of the tenant to supervise the behavior of the tenant container.

At step 304, the method 300 comprises encrypting at least some of the information related to the tenant container. For example, all the information received from the endpoint agent in the step 302 may be encrypted or at least the first computing device encrypts some of the information that is received from the endpoint agent.

In some examples, the information may be encrypted using a public key. The public key may be received by the first computing device by registering for an encryption service executing within a secure environment that is hosted by the second computing device.

In some embodiments, encrypting at least some of the information may include registering for the encryption service executing within the secure environment hosted by the second computing device. When the first computing device registers for the encryption service, the first computing device may obtain a public key which is generated within or inserted into the secure environment. The first computing device may use the public key for encrypting at least some of the information related to the tenant container.

In some examples, prior to encrypting the information related to the tenant container, the information which needs to be encrypted may be identified as illustrated by the optional step 303. For example, the CFM module on the first computing device may be configured to identify at least some of the information related to the tenant container which is to be encrypted.

At step 308, the method 300 comprises transmitting the encrypted information to be decrypted at the second computing device in a secure environment in the second computing device. The first computing device may transmit the encrypted information to the second computing device for analysis of the information in the secure environment.

In some embodiments, at step 308, the method 300 may include transmitting the encrypted information to a tenant associated with the tenant container. When the first computing device transmits the encrypted information to the tenant, the tenant may decrypt the information using a private key. The tenant may analyze the information collected by the endpoint agent which is resident on the first computing device and controlled by the CSP.

Figure 4:
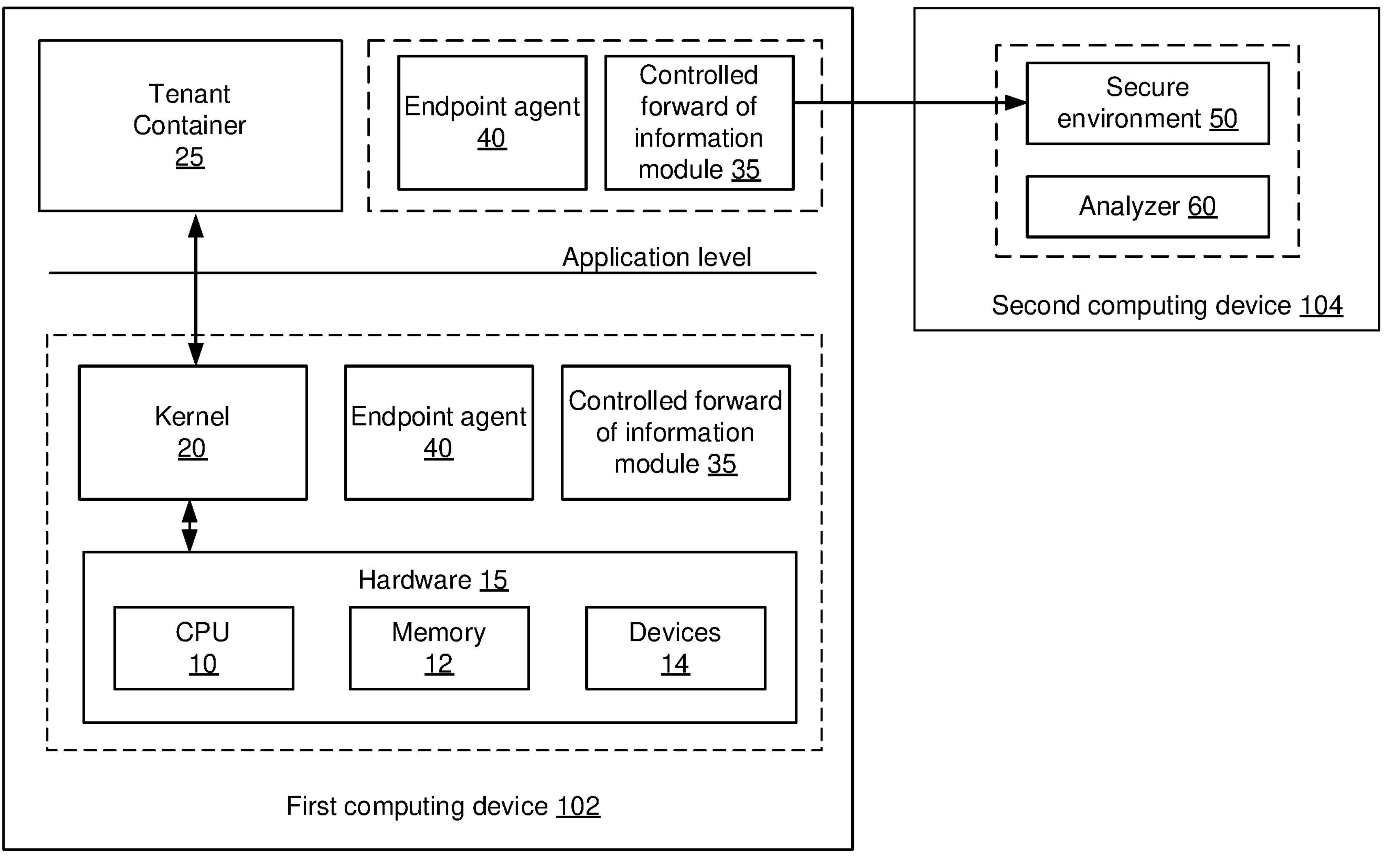
FIG. 4 discloses an example implementation for securing the information related to the tenant container.

FIG. 4 discloses an example implementation for securing the information related to the tenant container. As depicted in FIG. 4, the first computing device 102 may include a tenant container 25, an endpoint agent 40 and a control forward of information module 35.

It should be noted that the endpoint agent 40 and the control forward of information module 35 may be implemented at an application level within the first computing device 102 or in some implementations the endpoint agent 40 and the control forward of information module 35 may be instantiated in a kernel 20 as shown in the FIG. 4.

It should be noted that there may be an exclusive access between the endpoint agent and the CFM and no other process that is being executed at the first computing device can access the information collected by the endpoint agent from the tenant container. Further, it should also be noted that no process running on the first computing device can interact with the endpoint agent.

The second computing device 104 may host a secure environment 50 and may include an analyzer 60 which lies outside the secure environment 50.

In some embodiments, the first computing device 102 may register for an encryption service executing within the secure environment 50 hosted by the second computing device 104. For example, the first computing device 102 may be configured for generating a request for the encryption service and transmitting the request for the encryption service to the secure environment 50.

The first computing device 102 may obtain a public key which is generated within or inserted into the secure environment 50 in response to the request transmitted to the secure environment 50. The public key may be used by the first computing device for encrypting at least some of the information related to the tenant container 25 at the first computing device 102.

The endpoint agent 40 that is resident on the first computing device 104 may be configured for collecting the information related to the tenant container during execution of the tenant container.

In some embodiments, the controlled forward of information module 35 may be configured for receiving information collected from the tenant container during execution of the tenant container from the endpoint agent 40 resident on the first computing device (102) and encrypting the at least some of the information related to the tenant container. In some examples, the controlled forward of information module 35 may be configured for encrypting all the information related to the tenant container. In some examples, the controlled forward of information module 35 may be configured for encrypting at least some of the information related to the tenant container using the public key obtained from the secure environment hosted in the second computing device 104.

After encrypting the information related to the tenant container, the controlled forward of information module 35 may be configured for transmitting the encrypted information which is decrypted in the secure environment at the second computing device 104 using the private key.

In some embodiments, the tenant may control the information that leaves the secure environment 50 for the analysis by the CSP at the analyzer 60. For example, the tenant may access the secure environment 50 hosted in the second computing device 104 i.e., by using a secure method which may be decided by the CSP. Alternatively, the tenant may access the secure environment 50 using any other method that may be in control of an owner of the secure environment 50. In some instances, it may be possible that the tenant may be the owner of the secure environment 50.

In some embodiments, the information that leaves the secure environment 50 may be controlled by the tenant by accessing the secure environment 50. For example, an input may be received from the tenant on what information related to tenant container leaves the secure environment 50 hosted in the second computing device. It may also be possible that information that leaves the secure environment 50 may be configured in another way, for example, it may be hardcoded in the secure environment 50.

After accessing the secure environment 50, the tenant may select or change the settings of what information related to the tenant container is exposed to the CSP for analysis at the analyzer 60. The tenant may be provided with a graphical user interface, GUI, for changing the settings of what information related to the tenant container leaves the secure environment 50 for analysis by the CSP at the analyser 60. In some examples, the settings may be image specific, for a sensitive image. The tenant may select not to share any information with the CSP for these specific image while for other images, the tenant may allow complete or partial transparency of information.

In some embodiments, the information leaving the secure environment 50 is identified and at least some of the identified information leaving the secure environment is selectively masked.

In some embodiments, the information leaving the secure environment 50 is selectively encrypted by identifying the information leaving the secure environment 50 and at least some of the identified information leaving the secure environment is selectively replaced with a plurality of encrypted strings.

In some embodiments, the information leaving the secure environment 50 is selectively encrypted by identifying the information leaving the secure environment 50 and the result is analysed for the information that leaves the secure environment.

In some embodiments, composition of the information leaving the secure environment 50 may be dependent on a receiver of the information. For example, the receiver may be a tenant associated with the tenant container and a cloud service provider, CSP, hosting the tenant container.

Thus, the information related to the tenant container that leaves the secure environment 50 may be filtered based on the settings or the configuration provided by the tenant. The secure environment 50 is configured to analyse the information related to the tenant container that enters the secure environment 50. The result of the analysis of the information entering the secure environment 50 is identified and/or monitored by the secure environment 50. For example, some of the existing algorithms and/or machine learning models can be used to produce the result of analysis of the information that enters the secure environment 50. A summary of the information leaving the secure environment 50 is generated in the secure environment 50 and can be published by the secure environment 50 to provide the tenant a trustworthy summary of what is fetched from the secure environment 50. The filtered information may then be transmitted to the analyzer 60 for analysis for detection of any cyber threat or any suspicious behaviour. Further, the summary of the information leaving the secure environment is transmitted to the tenant.

Figure 5:
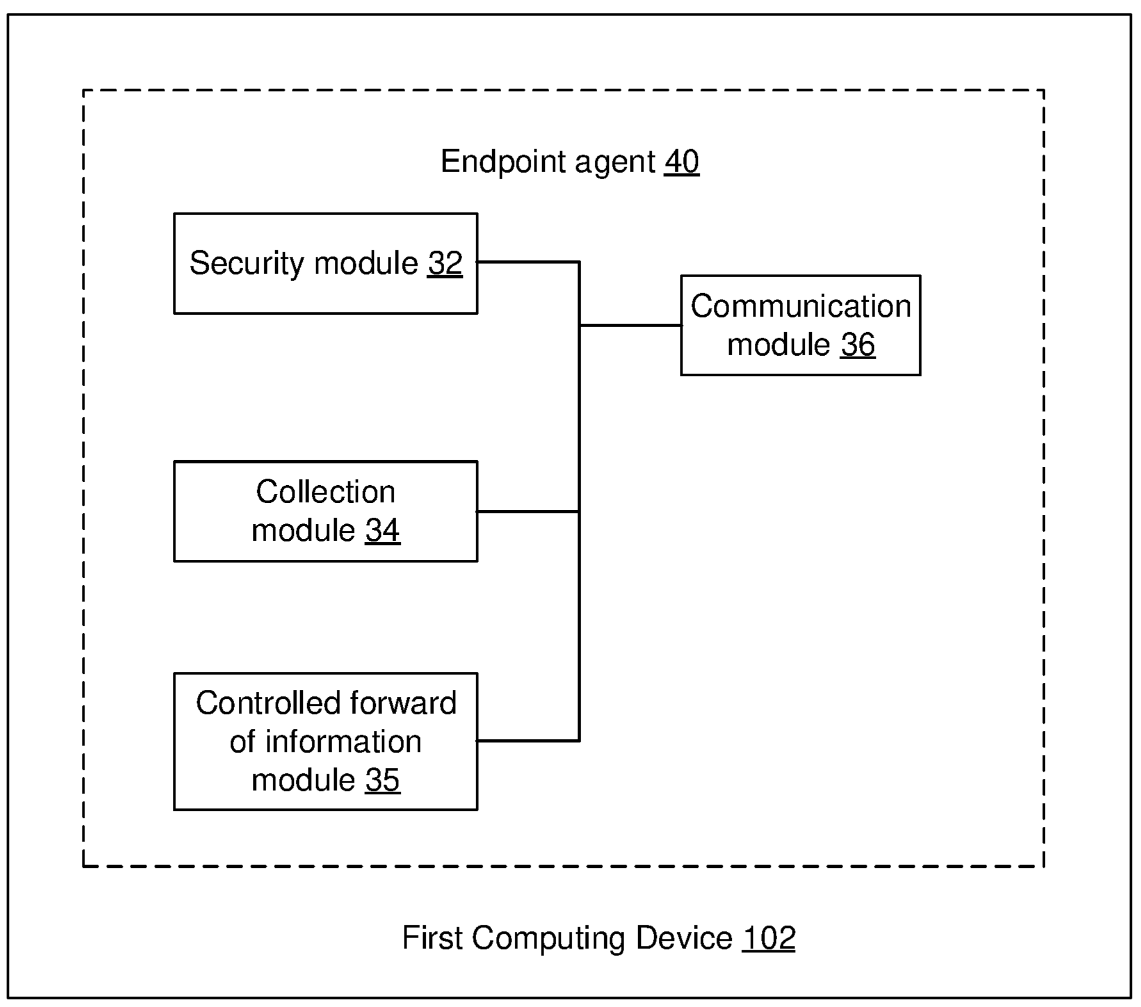
FIG. 5 is an example schematic diagram showing functional modules of an endpoint agent according to some embodiments.

FIG. 5 is an example schematic diagram showing functional modules of an endpoint agent according to some embodiments. As depicted in the FIG. 5, the endpoint agent 40 on the first computing device 102 may include one or more modules configured to cooperate with each other for securing the information related to the tenant container. For example, the endpoint agent 40 may include a security module 32, a collection module 34, a controlled forward of information module 35 and a communication module 36.

The security module 32 may be configured for registering for an encryption service executing within the secure environment hosted in the second computing device. The security module 32 may be configured for generating a request for the encryption service and transmitting the request for the encryption service to the secure environment. Further, the security module 32 may obtain a public key from the secure environment 50 in response to the request transmitted to the secure environment. Furthermore, the security module may transmit the public key to the controlled forward information module 35 for encryption of the information related to the tenant container.

The collection module 34 in the endpoint agent 40 may monitor and collect the information related to the tenant container, which may include of data of multiple software processes executing on the first computing-device and one or more users of the first computing-device.

The collection module 34 may collect information related to the tenant container that may include metadata, events, and alerts regarding at least the users, multiple software processes, relationships between the software processes executing on the first computing device, operation of the first computing device, private data, Personal Identifiable Information, PII, and operating system configuration changes.

The controlled forward of information module 35 may be configured for reception of collected information of the tenant container, from the collection module 34. There may be an exclusive access between the endpoint agent and the CFM and no other process that is being executed at the first computing device can access the information collected by the endpoint agent from the tenant container. Further, it should also be noted that no process running on the first computing device can interact with the endpoint agent.

Further, the controlled forward of information module 35 may be configured for encryption of the collected information related to the tenant container. In some examples, the controlled forward of information module 35 may be configured for encrypting all the information related to the tenant container. In some examples, the controlled forward of information module 35 may be configured for encrypting at least some of the information related to the tenant container using the public key obtained from the secure environment hosted in the second computing device 104.

The communication module 36 may be configured for periodically transmitting the encrypted information related to the tenant container to the second computing device installed on the network connected to the first computing device 102.

Figure 6:
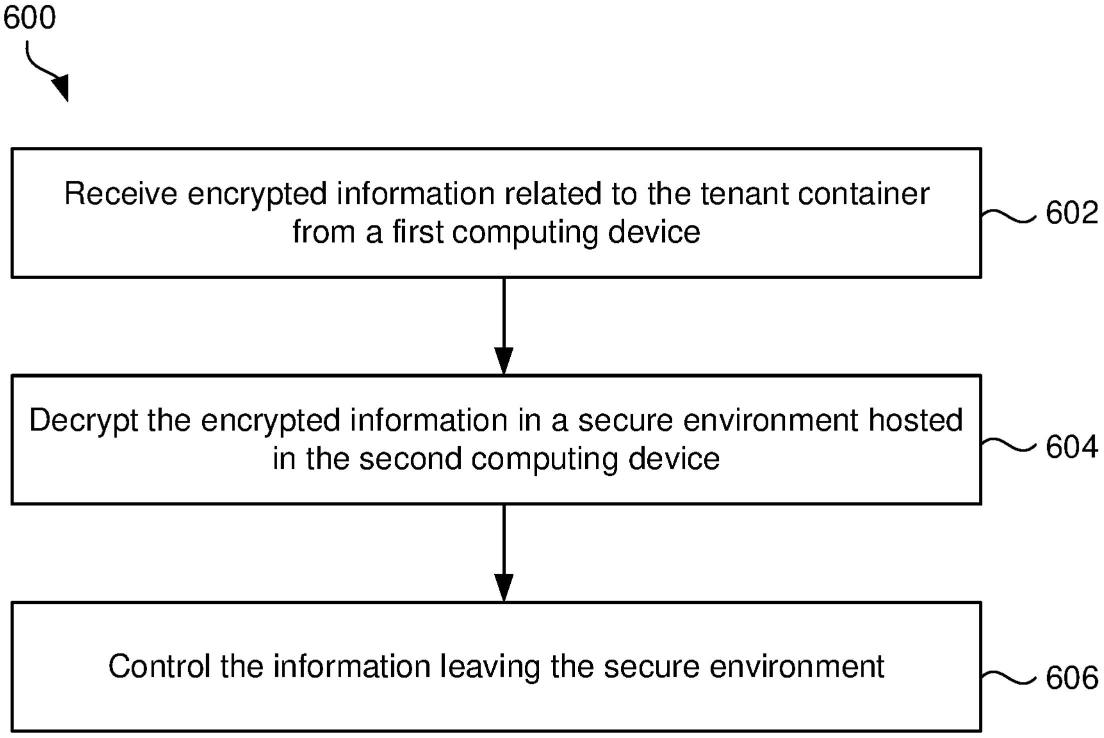
FIG. 6 is a flowchart illustrating example method steps of a method performed by a second computing device for analysing the information related to the tenant container.

FIG. 6 is a flowchart illustrating example method steps of a method 600 performed by a second computing device for analysing the information related to the tenant container. The second computing device may implement the method 600 for analysing the information related to the tenant container. At step 602, the method 600 comprises receiving encrypted information related to the tenant container from the first computing device. The second computing device least one device may include a secure environment which may be trusted execution environment in which an encryption service may execute. The encryption service may be to encrypt or decrypt the information related to the tenant container, received from the first computing device.

In some examples, the second computing device may include an encryption agent to provide the information to the encryption service. The encryption service may comprise, for example, at least an encryption interface and a decryption interface to interact with the encryption agent. The encryption service may further be to register the encryption agent prior to accepting information for encryption or decryption from the computing devices i.e., the first computing device or the second computing device. The secure environment may further comprise an encryption key corresponding to the at least one computing device and the encryption key may be generated by the encryption service when the encryption agent is registered. The encryption service may also be to use the encryption key to encrypt or decrypt the data provided by the encryption agent.

In some aspects, the second computing device may further comprise a communication module to transmit the encrypted information related to the tenant container to, and receive encrypted information from, a remote resource. The remote resource may comprise, for example, a plurality of networked computing devices accessible via at least a wide-area network, the plurality of networked computing devices comprising at least a memory module to store encrypted data.

An example method consistent with at least one embodiment of the present disclosure may comprise receiving information related to the tenant container from at least one first computing device at an encryption service executing within the secure environment i.e., a trusted execution environment. Further, the information may be encrypted or decrypted in the encryption service and the encrypted or the decrypted information may be provided to at least one second computing device or a virtual machine.

In some examples, the secure environment in the second computing device may receive the encrypted information from the first computing device. The secure environment may be a trusted execution environment belonging to the CSP or the tenant.

At step 604, the method 600 comprises decrypting the encrypted information in the secure environment. The information may be decrypted in the secure environment by the encryption service using the private key.

At step 606, the method comprises controlling the information leaving the secure environment. In some examples, the tenant may control the decrypted information that leaves the secure environment for the analysis by the CSP. The tenant may access the secure environment and the tenant may select or change the settings of what information is exposed to the CSP for analysis as described in FIG. 4. Thus, the information related to the tenant container which is decrypted in the secure environment may be filtered based on the settings or the configuration provided by the tenant. The filtered information may then be transmitted for analysis for detection of any cyber threat or any suspicious behaviour.

Figure 7:
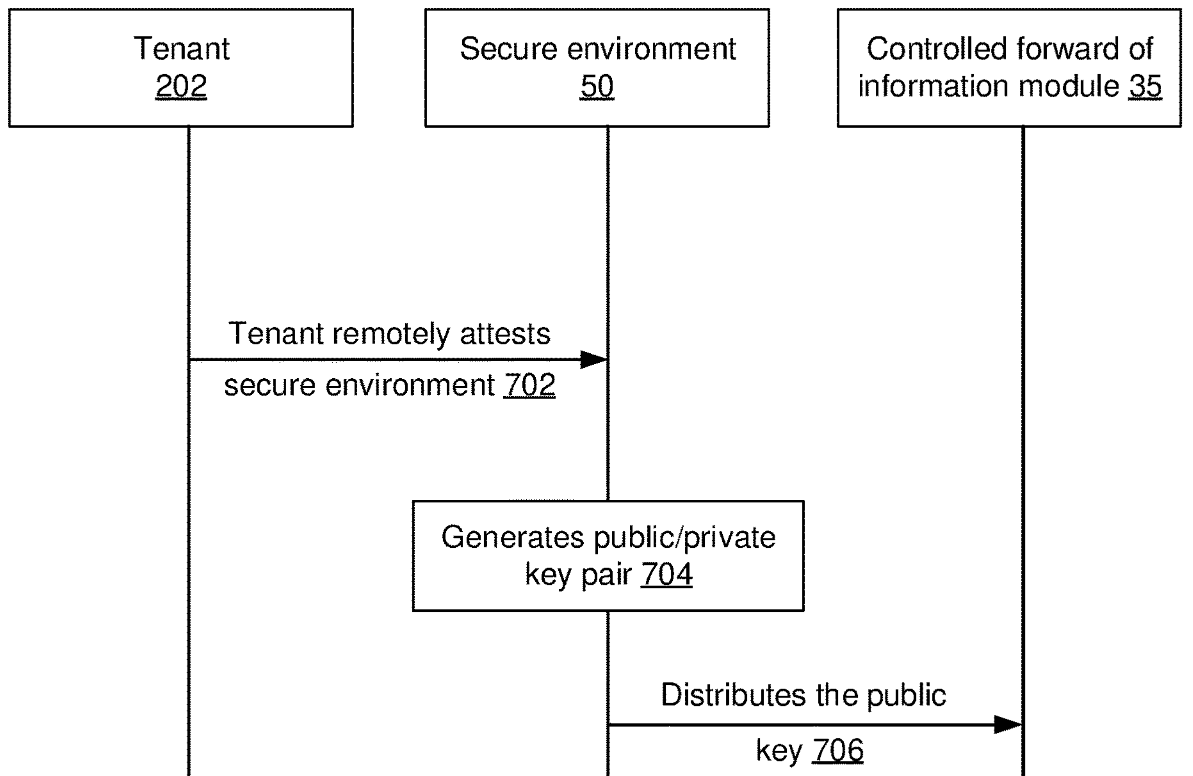
FIG. 7 is a sequence diagram illustrating various steps performed for initial configuration for securing the information related to the tenant container according to some embodiments.

FIG. 7 is a sequence diagram illustrating various steps performed for initial configuration for securing the information related to the tenant container according to some embodiments. The various steps performed for the initial configuration for securing the information related to the tenant container are illustrated in the FIG. 7. As described above, the controlled forward of information module 35 may reside in the first computing device and the secure environment 50 may be hosted by the second computing device.

The tenant 200 may remotely attests (702) the secure environment 50. For example, the tenant 200 may authorize the secure environment to ensure that the secure environment 50 is trustworthy for securing the container belonging to the tenant 200. The secure environment generates (704) a public key and private key pair to be used for encryption of the information related to the tenant container. Further, the secure environment 50 distributes (706) the generated public key to the controlled forward of information module 35 and the secure environment may also distribute the private key to the tenant. The tenant may decrypt the encrypted information by the controlled forward of information module 35 using the private key received from the secure environment 50.

Figure 8:
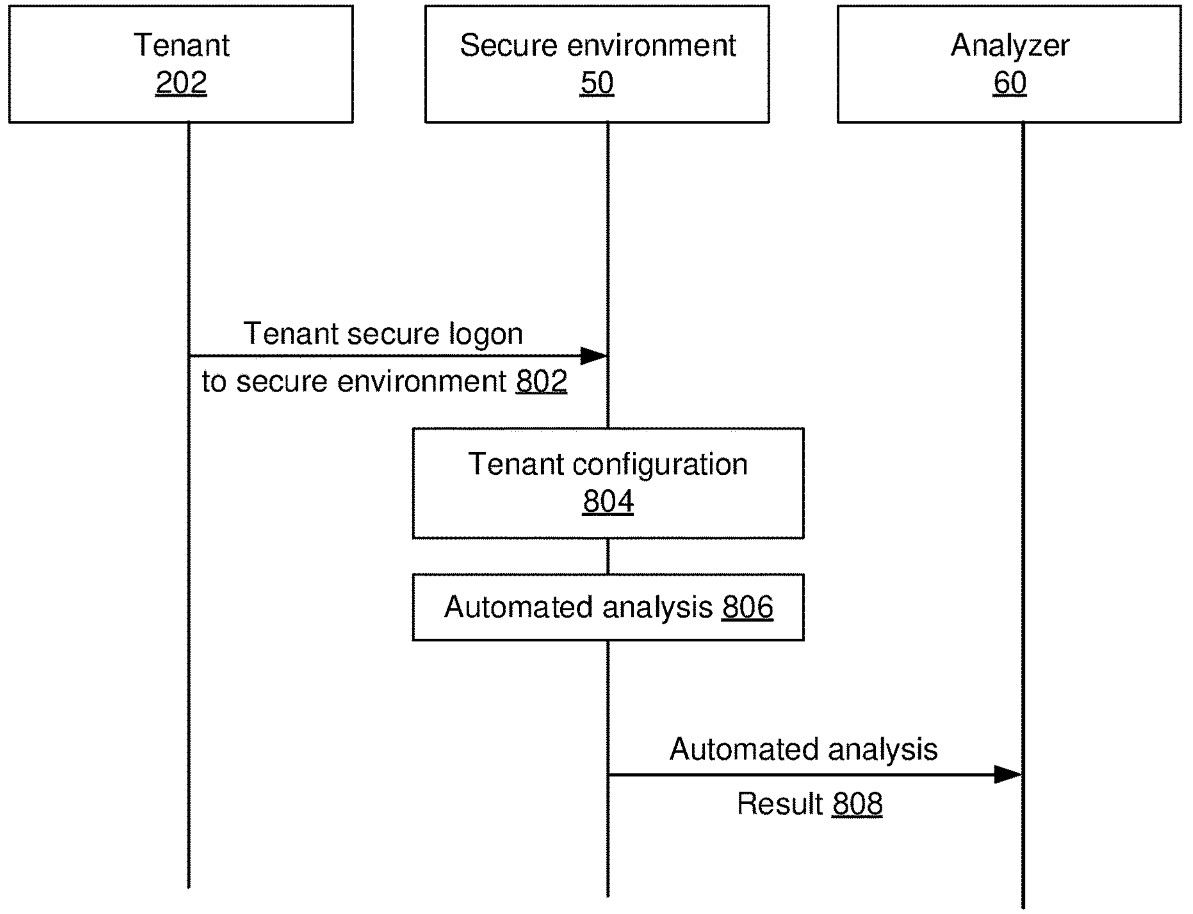
FIG. 8 is a sequence diagram illustrating various steps in which a tenant controls the information to be transmitted for analysis according to some embodiments.

FIG. 8 is a sequence diagram illustrating various steps in which a tenant 200 controls the information to be transmitted for analysis according to some embodiments. As described in the FIG. 4, the second computing device includes the secure environment 50 and the analyzer 60. The tenant 200 may access the secure environment 50 hosted in the second computing device 104 i.e., by using a secure method which may be decided by the CSP. For example, the tenant logs (802) on to the secure environment 50. After logging on to the secure environment 50, the tenant may configure (804) or change the settings of what information related to the tenant is exposed to the CSP for analysis. In an example, the tenant 200 may be provided with the GUI, for changing the settings of what information related to the tenant container leaves the secure environment 50 for analysis by the CSP. The secure environment 50 performs (806) automated filtering or analysis of the information related to the tenant container based on the configuration provided by the tenant. The secure environment 50 may also implement one or more machine-learning models to analyze the information related to the tenant container. The secure environment 50 may be configured to implement cyber threat mechanisms that references one or more machine-learning models trained on potential cyber threats to analyze for potential cyber threats on the first computing-device. A result of the analysis is generated in the secure environment 50 and leaves the secure environment 50 instead of the complete information. Further, the secure environment 50 transmits (808) the results of automated analysis to the analyzer 60.

Figure 9:
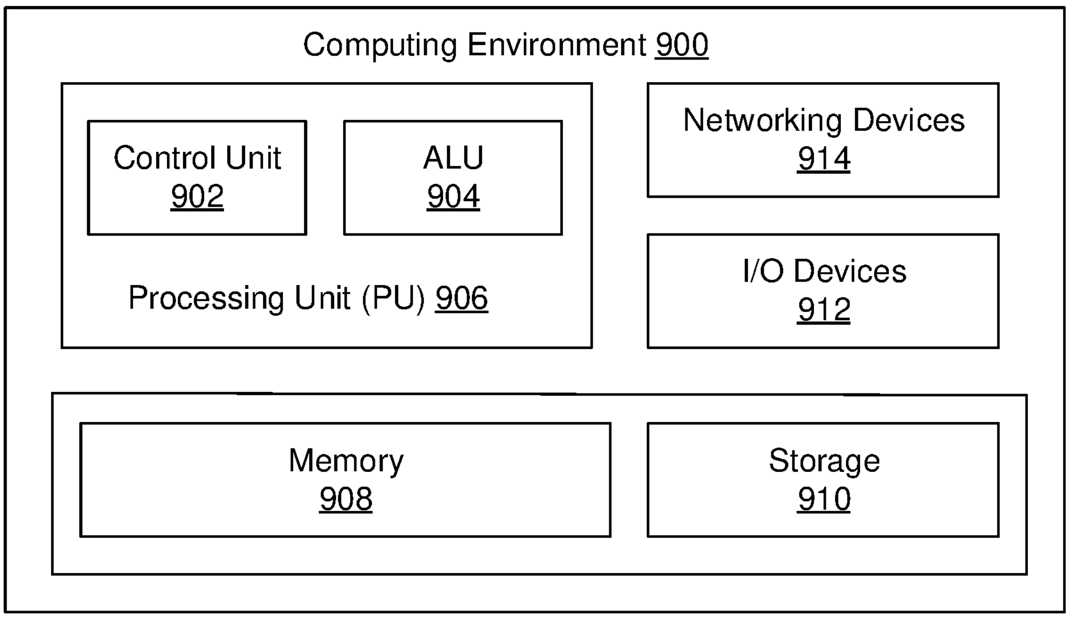
FIG. 9 discloses an example computing environment.

FIG. 9 illustrates an example computing environment 900 implementing a method and the first computing device and the second computing device for securing the information related to the tenant container as described in FIG. 3 and FIG. 6. As depicted in FIG. 9, the computing environment 900 comprises at least one data processing unit 906 that is equipped with a control unit 902 and an Arithmetic Logic Unit, ALU 904, a memory 912, a storage 914, plurality of networking devices 908 and a plurality Input output, I/O devices 910. The data processing unit 906 is responsible for processing the instructions of the algorithm. For example, the data processing unit 906 is equivalent to the processor of the network node. The data processing unit 906 is capable of executing software instructions stored in memory 912. The data processing unit 906 receives commands from the control unit 902 in order to perform its processing. Further, any logical and arithmetic operations involved in the execution of the instructions are computed with the help of the ALU 904.

The computer program is loadable into the data processing unit 906, which may, for example, be comprised in an electronic apparatus (such as a UE or a network node). When loaded into the data processing unit 906, the computer program may be stored in the memory 912 associated with or comprised in the data processor. According to some embodiments, the computer program may, when loaded into and run by the data processing unit 906, cause execution of method steps according to, for example, any of the methods illustrated in FIGS. 3 and 6 or otherwise described herein The overall computing environment 900 may be composed of multiple homogeneous and/or heterogeneous cores, multiple CPUs of different kinds, special media and other accelerators. The data processing unit 906 is responsible for processing the instructions of the algorithm. Further, the plurality of data processing units 906 may be located on a single chip or over multiple chips.

The algorithm comprising of instructions and codes required for the implementation are stored in either the memory 912 or the storage 914 or both. At the time of execution, the instructions may be fetched from the corresponding memory 912 and/or storage 914, and executed by the data processing unit 906.

In case of any hardware implementations various networking devices 908 or external I/O devices 910 may be connected to the computing environment to support the implementation through the networking devices 908 and the I/O devices 910.

The embodiments disclosed herein can be implemented through at least one software program running on at least one hardware device and performing network management functions to control the elements. The elements shown in FIG. 9 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the disclosure.

The invention claimed is:

1. A method for securing information related to a tenant container, the method performed by a second computing device, the method comprising:

receiving encrypted information related to the tenant container from a first computing device;

decrypting the encrypted information in a secure environment hosted by the second computing device; and controlling the information leaving the secure environment, wherein controlling the information leaving the secure environment comprises:

selectively encrypting the information by:

identifying the information leaving the secure environment; and further identifying result of analysis of the identified information leaving the secure environment.

2. The method according to claim 1, wherein the step of controlling the information leaving the secure environment comprises:

identifying the information leaving the secure environment; and selectively masking at least some of the identified information leaving the secure environment.

3. The method according to claim 1, wherein the step of controlling the information leaving the secure environment comprises: selectively encrypting the information by:

identifying the information leaving the secure environment; and selectively replacing at least some of the identified information leaving the secure environment with a plurality of encrypted strings.

4. The method according to claim 1, wherein composition of the information leaving the secure environment is dependent on a receiver of the information, wherein the receiver is one or more of: a tenant associated with the tenant container and a cloud service provider, CSP, hosting the tenant container.

5. The method according to claim 1, wherein the step of decrypting the encrypted information in a secure environment comprises:

registering for an encryption service executing within the secure environment hosted by the second computing device;

obtaining a private key which is generated or inserted into the secure environment in the second computing device; and decrypting the encrypted information related to the tenant container using the private key.

6. The method according to claim 1, wherein the step of registering for an encryption service executing within a secure environment comprises:

generating a request for the encryption service; and transmitting the request for the encryption service to the secure environment.

7. The method according to claim 1, wherein the information from the tenant container comprises metadata, events, and alerts.

8. The method according to claim 1, wherein a summary of the information leaving the secure environment is generated in the secure environment.

9. The method according to claim 8, further comprising:

transmitting, to a tenant associated with the tenant container, the summary of the information leaving the secure environment.

10. A second computing device for securing information related to a tenant container, comprising processing circuitry and memory, the second computing device being adapted for:

receiving encrypted information related to the tenant container from a first computing device;

decrypting the encrypted information in a secure environment hosted in the second computing device; and controlling the information leaving the secure environment, wherein controlling the information leaving the secure environment comprises:

selectively encrypting the information by:

identifying the information leaving the secure environment; and further identifying result of analysis of the identified information leaving the secure environment.

* * * * *